United States Patent [19]

Addeo et al.

[11] Patent Number: 5,280,540

[45] Date of Patent: Jan. 18, 1994

[54] VIDEO TELECONFERENCING SYSTEM EMPLOYING ASPECT RATIO TRANSFORMATION

[75] Inventors: Eric J. Addeo, Long Valley; Michael H. Bianchi; Thomas H. Judd, both of Madison; Henri E. Tohme, Basking Ridge, all of N.J.

[73] Assignee: Bell Communications Research, Inc., Livingston, N.J.

[21] Appl. No.: 774,182

[22] Filed: Oct. 9, 1991

[51] Int. Cl.⁵ .............................................. H04N 1/42
[52] U.S. Cl. ...................................... 379/54; 358/528
[58] Field of Search ............ 379/53, 54, 202, 204–206; 358/140–143, 85, 55, 77

[56] References Cited

U.S. PATENT DOCUMENTS

| | | |
|---|---|---|
| 3,097,262 | 7/1963 | Ehrenhaft . |
| 4,054,908 | 10/1977 | Poirier et al. ........................ 379/202 |
| 4,223,343 | 9/1980 | Belmares-Sarabia et al. ......... 358/54 |
| 4,400,724 | 8/1983 | Fields .................................... 379/54 |
| 4,839,720 | 6/1989 | Isnardi ................................. 358/141 |
| 4,890,314 | 12/1989 | Judd et al. ............................ 379/53 |
| 4,928,301 | 5/1990 | Smoot ................................... 379/53 |

FOREIGN PATENT DOCUMENTS 1-258581  10/1989  Japan .

Primary Examiner—Wing F. Chan
Attorney, Agent, or Firm—Leonard Charles Suchyta; Loria B. Yeadon

[57]   ABSTRACT

A teleconferencing system (100, 100') provides a wide aspect ratio view at each site utilizing a single NTSC camera (250, 350) and projector (260, 360). At the transmitting end of a teleconference, a transformation element (280, 380, 510, 610) maps a wide aspect ratio field of view into the field of view of an NTSC camera. The transformation is reversed at the receiving end of the teleconferencing system.

10 Claims, 7 Drawing Sheets

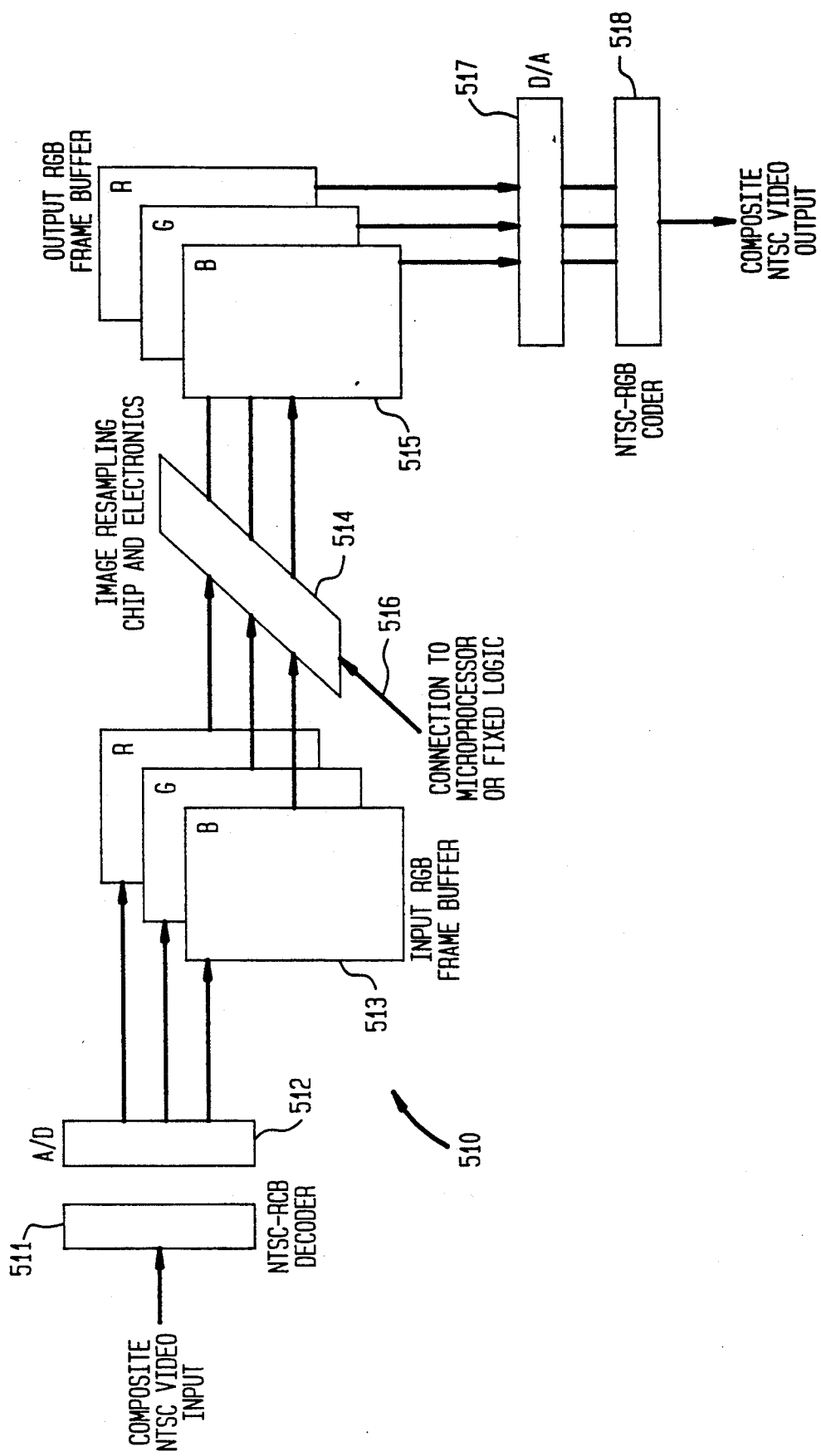

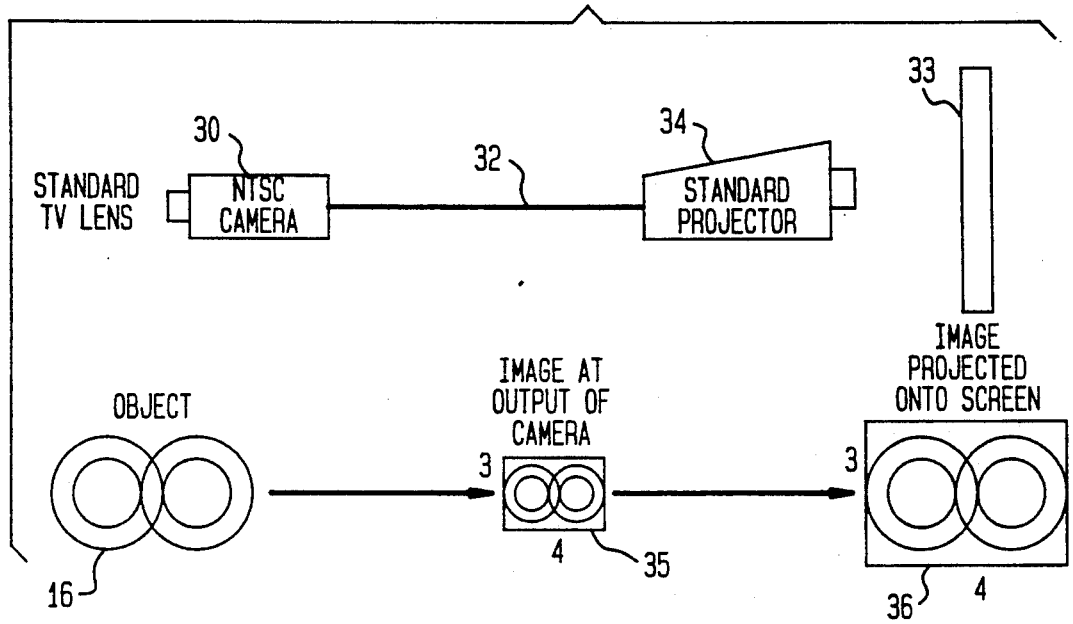
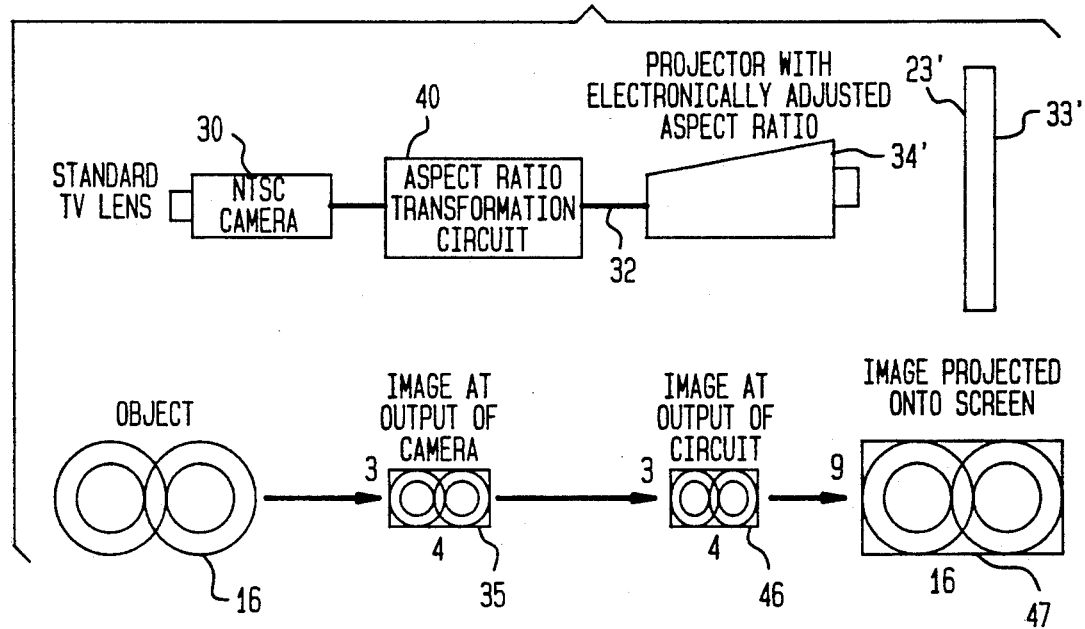

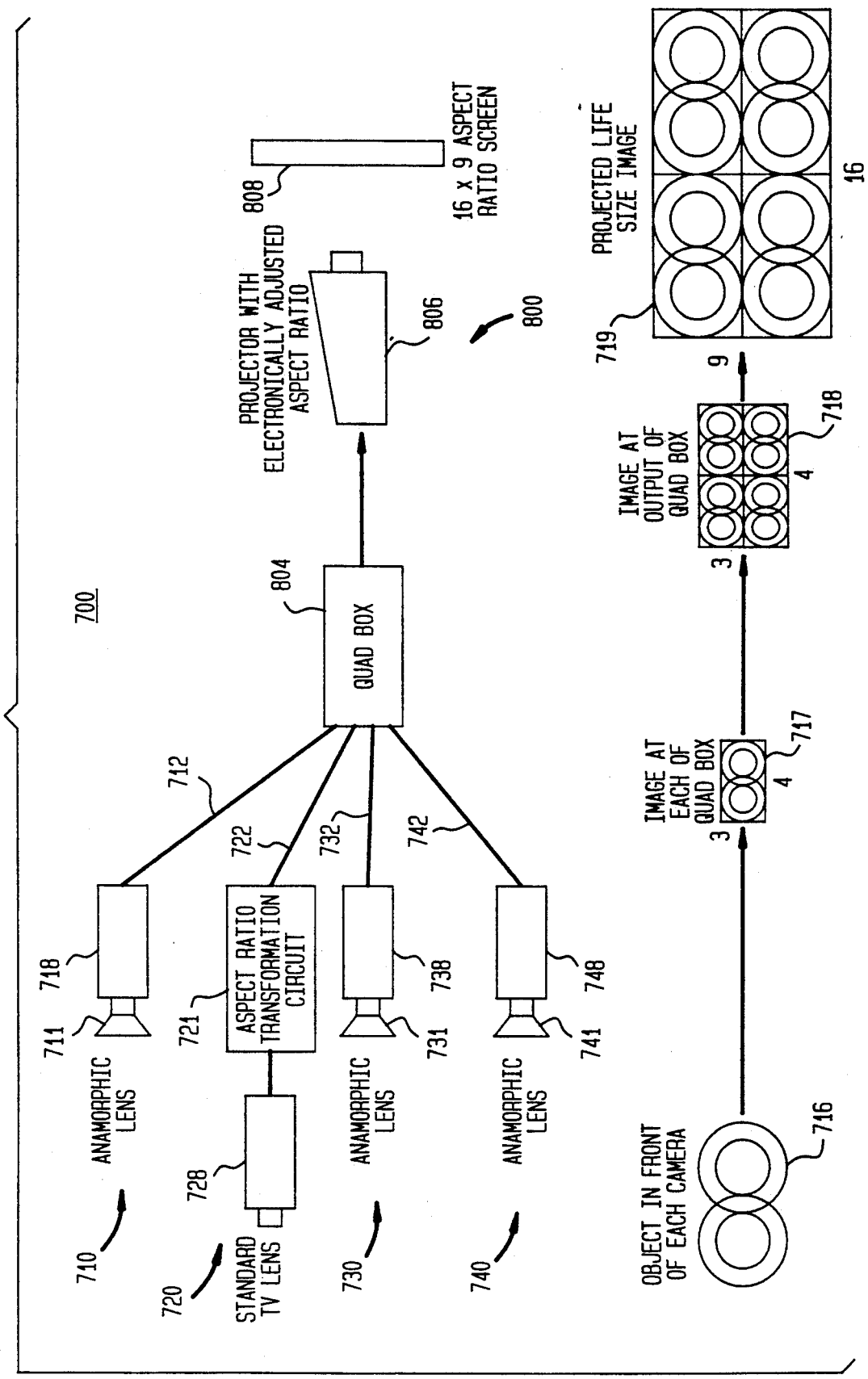

VIDEO TELECONFERENCING SYSTEM EMPLOYING ASPECT RATIO TRANSFORMATION

FIELD OF THE INVENTION

The present invention relates to a video teleconferencing system. Specifically, the present invention relates to a video teleconferencing system that provides a wide aspect ratio, panoramic view at each teleconferencing site. This is accomplished using a single NTSC (National Television Standards Committee) camera and projector at each site and using NTSC transmission facilities.

BACKGROUND OF THE INVENTION

The goal of a video teleconferencing system is to bring teleconferencing participants as "close together" as possible. Ideally, the effect obtained in a good teleconferencing system should be one of "being there".

The traditional video teleconference facility puts extreme limitations on the normal human protocols for interaction. Most traditional teleconference facilities offer some version of NTSC video which is displayed on a small-sized, home-television-like monitor. When the number of teleconference participants at the sending end of a conference is larger than one, the image of each participant occupies a small portion of an already small viewing area. As a result, it becomes difficult for viewers at the receiving end of such a teleconference to pick up non-verbal cues from a speaker's face and body. Indeed, in many cases, it is often difficult to discern at the receiving end who of the many participants at the sending end is actually talking.

To overcome this problem, it is desirable for a video teleconferencing facility to replace the conventional monitor with a larger monitor which provides a wide aspect ratio, panoramic view of the remote teleconferencing site. An ordinary NTSC monitor is relatively square, having an aspect ratio which is four units in the horizontal direction to three units in the vertical direction (i.e., $4 \times 3 = 1.33 \times 1$). Because of this, it is not desirable to simply replace the conventional small-sized teleconference monitor with a large-sized monitor having the same NTSC aspect ratio. The reason is that in many cases a plurality of teleconference participants at a remote site sit side-by-side. When an image of the remote site is locally displayed on an NTSC monitor of any size, good interaction with the participants at the remote site is not achieved, as the relatively square aspect ratio of the NTSC monitor does not permit a wide enough view of the remote conference site. Accordingly, it is desirable to replace the small-sized NTSC monitor of the conventional teleconference facility with a monitor having a wide aspect ratio screen, specifically, a screen with a wider aspect ratio than the conventional NTSC monitor.

One way to achieve a wide aspect ratio display for a teleconferencing facility is to utilize High Definition Television (HDTV) equipment. An HDTV monitor has an aspect ratio of $16 \times 9$ ($1.78 \times 1$) which is wider than the NTSC aspect ratio of $4 \times 3$ ($1.33 \times 1$). Unfortunately, the high cost and large transmission bandwidth (approximately 622 Mbp/s for digital transmission and 30 MHz for analog transmission) and the requirement for large lighting levels at the conference sites make presently available HDTV equipment unsuitable for most teleconferencing applications.

Another approach for achieving a teleconferencing system with wide aspect ratio displays is to equip each teleconference station with a plurality of NTSC video cameras, each generating an NTSC video signal corresponding to a sub-image. For example, two NTSC cameras can be positioned so that their fields of view are side by side. Each of the cameras produces a sub-image which by its itself has a $4 \times 3$ aspect ratio. The individual sub-images are each transmitted via an individual transmission channel to a remote teleconference site. At the remote teleconference site, multiple projectors are aligned to display the sub-images on a screen in a side-by-side fashion. The net result is a combined image having a wide aspect ratio of $8 \times 3$.

There are several problems associated with the use of a plurality of NTSC cameras to produce a single wide aspect ratio video image. One problem is that the multiple cameras cannot simply be placed side by side. Such an arrangement of cameras results in a complicated overlapping of the fields of view of the individual cameras so that there are some spatial locations which are in the field of view of no camera and some spatial locations which are in the field of view of more than one camera. To overcome this problem, sophisticated optical and/or electronic arrangements may be utilized to insure that the fields of view of the multiple cameras merge continuously into a single field of view (see U.S. Pat. No. 4,890,314). Similarly, the multiple projectors at the display end must be precisely positioned so that the individually displayed sub-images merge to form a single combined image. Thus, this approach to wide aspect ratio video teleconferencing requires precision mechanical alignments which are vulnerable to slight physical perturbations of either the cameras or the projectors. The net result is a fragile system requiring frequent maintenance. Multiple cameras and projectors also have the tendency to exhibit color and image size variations causing distortions in the merged sub-images. With multiple cameras, projectors and transmission channels, the overall system becomes expensive to own and operate.

In view of the foregoing, it is an object of the present invention to provide a video teleconferencing system, utilizing a wide aspect ratio display at each teleconferencing site, which overcomes the shortcomings of the prior art systems. In particular, it is an object of the present invention to provide a teleconferencing system which provides a wide aspect ratio display at each site utilizing a single NTSC camera and projector at each site.

SUMMARY OF THE INVENTION

The present invention is a video teleconferencing system which provides a wide aspect ratio view at each site utilizing a single NTSC camera and projector at each site.

At the transmitting end of a teleconference, a wide aspect ratio field of view (for example the $16 \times 9$ field of view of HDTV) is transformed either optically or electronically, so that an image thereof can be transmitted using a single NTSC camera and a single channel NTSC transmission facility. At the receiving end, the transformation in the image is reversed to produce a wide aspect ratio display using an NTSC projector.

The transmitting teleconferencing station comprises an NTSC camera and a transformation element coupled to the camera. To perform an aspect ratio transformation from HDTV (16×9) to NTSC (4×3), the transformation element expands the vertical component of the image by a factor of 1.33, leaving the horizontal component unchanged, or reduces the horizontal component of the image by a factor of 1.33, leaving the vertical component unchanged. The effect of the transformation is to map the 16×9 HDTV field of view into the 4×3 field of view of the NTSC camera.

The transformation at the transmitting end may be accomplished optically using an anamorphic lens at the input of the NTSC camera. The transformation at the transmitting end may also be accomplished electronically using a real time image resampling chip to expand or reduce one image dimension using interpolation or decimation.

The NTSC signal resulting from the combined processing of the transformation element and NTSC camera is transmitted to a remote teleconference site. At the remote site, a reverse transformation is performed to convert back from an NTSC aspect ratio to an HDTV aspect ratio. This can be accomplished optically or electronically. The NTSC signal is received at the remote teleconference site by an NTSC projector. If the projector is an LCD projector, an anamorphic lens may be connected at the optical output of the projector to perform the reverse transformation. If the projector is a three gun CRT projector, the aspect ratio reverse transformation may be accomplished by electronically adjusting the gain of the vertical and/or horizontal deflection amplifiers in the projector.

The inventive system achieves wide aspect ratio video teleconferencing with a single NTSC camera and projector at each site. Neither optical nor electronic image merging is required. The inventive system solves the problems resulting from merging errors and the problems resulting from mismatches in color and brightness that are characteristic of the multiple camera and multiple projector systems used in the prior art to achieve wide aspect ratio displays. The inventive system offers both construction and maintenance cost savings over systems which achieve wide aspect ratio displays using multiple cameras and multiple projectors. The inventive system requires only a single NTSC transmission channel in each direction, not multiple channels as is the case with the prior art systems.

The inventive system is compatible with devices for combining multiple images on a single video signal (so-called "quad Boxes" or "Picture-In-Picture Boxes") because the video signals transmitted in the inventive system have an NTSC format. Such devices are useful in multipoint teleconferencing applications, whereby multiple camera images coming from several distinct remote conference sites are combined into a single video signal and displayed at a local conference site.

The capability of performing electronic aspect ratio transformations enables the inventive system to connect with conventional NTSC 4×3 displays without showing geometrically distorted images, but the wide aspect ratio image will only fill a portion of the 4×3 display. This is accomplished through use of an aspect ratio transformation circuit for processing the signal inputted to the 4×3 display.

In addition, when the wide aspect ratio is chosen to be 16×9, the display equipment utilized in the inventive system will be upwardly compatible to HDTV.

Finally, the inventive system may be utilized to achieve wide aspect views of remote sites in teleconferencing systems which utilize conventional video cameras and projectors constructed in accordance with a standard other than NTSC. Outside the United States, video cameras and projectors comply with other standards such as PAL and SECAM. The present invention can utilize cameras and projectors constructed in accordance with these standards to achieve wide aspect ratio views of remote sites.

BRIEF DESCRIPTION OF THE DRAWING

FIG. 6 illustrates an aspect ratio transformation circuit for use in the teleconferencing system of FIG. 5.

FIGS. 7A AND 7B illustrate the aspect ratio transformations which are performed in the teleconferencing system of FIG. 5.

FIG. 8 schematically illustrates multipoint teleconferencing system, in accordance with the present invention.

DETAILED DESCRIPTION OF THE INVENTION

Figure 1:
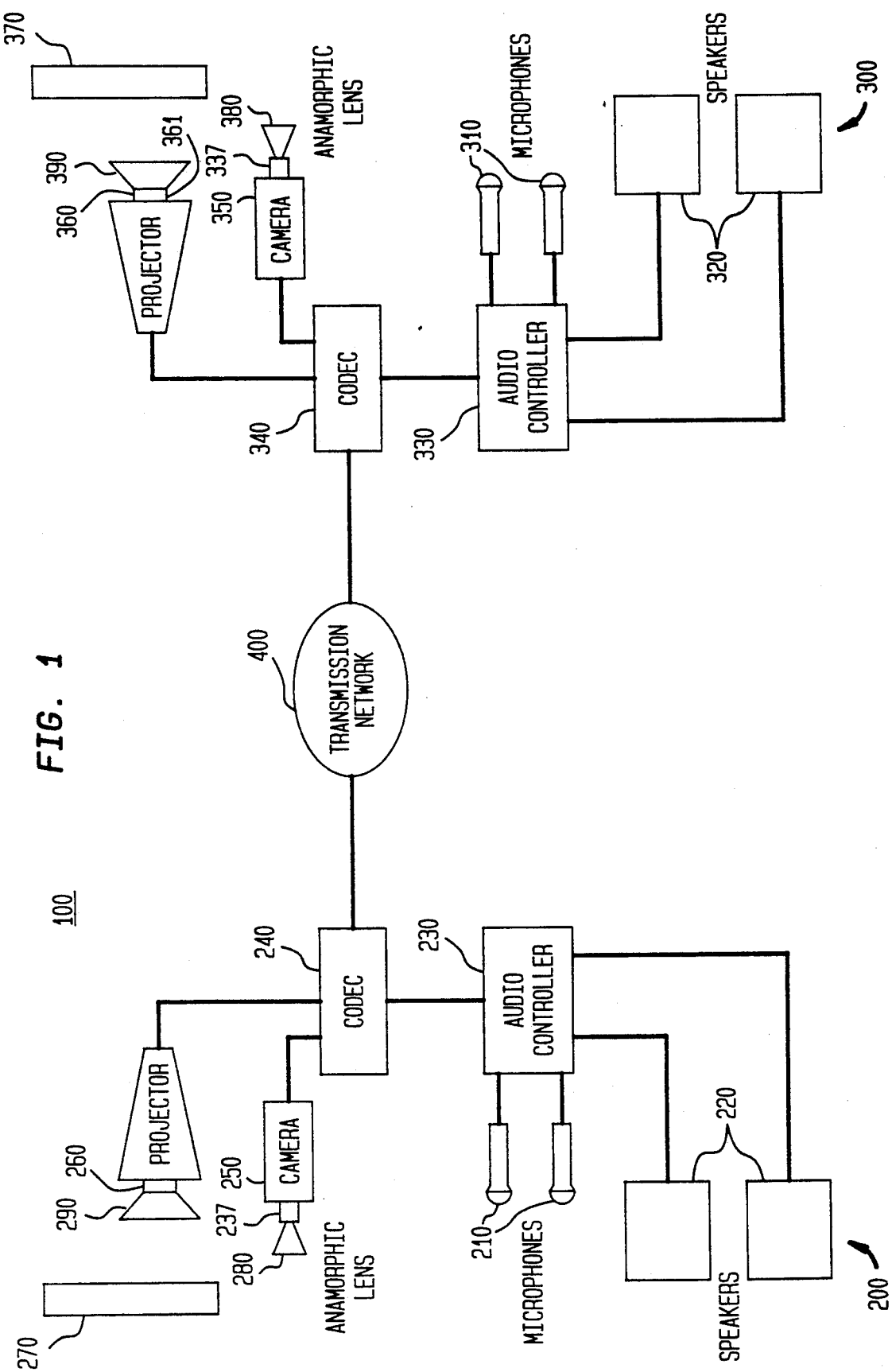
FIG. 1 schematically illustrates a teleconferencing system in accordance with an embodiment of the present invention.

A teleconferencing system in accordance with the present invention is illustrated in FIG. 1. The teleconferencing system 100 includes two stations 200 and 300. The two stations 200 and 300 are remotely located from each other and are connected via the transmission network 400. Preferably, the network 400 is a digital network offering transmission facilities from 64 Kb/s to 45 Mb/s and up. In short haul applications involving short distances between the two stations, an analog network may be utilized instead of a digital network.

Teleconference participants at the two stations 200 and 300 are in audio and video communication with each other.

Preferably, the audio communication system permits two way, fully interactive audio communication. To achieve audio communication, the station 200 comprises one or more microphones 210 for transmitting speech signals to the station 300 and one or more speakers 220 for receiving speech signals from the station 300. The microphones 210 and speakers 220 are connected to the audio controller 230. The audio controller 230 is connected to the NTSC codec 240. Similarly, the station 300 includes one or more microphones 310 for transmitting speech signals to the station 200 and one or more speakers 320 for receiving speech signals from the station 200. The microphones 310 and speakers 320 are connected to the audio controller 330 which is connected to the NTSC codec 340.

The present invention is primarily concerned with the video communication portion of the teleconferencing system 100. For video communication, the station 200 includes the NTSC video camera 250 for generating a video signal for transmission to the station 300 and the NTSC projector 260 for receiving a video signal from the station 300 and for displaying a corresponding video image on the screen 270. The camera 250 and projector 260 are connected to the NTSC codec 240. The codec 240 codes the video signal from the camera 250 so that it can be transmitted via the network 400 with a minimum of transmission bandwidth. The codec 240 also processes the audio signal from the microphones 210 to delay the audio signal by the same delay as the corresponding video signal, to code the audio signal for transmission, and to suppress echoes and acoustic instabilities. The codec 240 also decodes incoming video signals before transmitting them to the projector 260. The codec 240 also decodes incoming audio signals and delays the incoming audio signals so they are synchronous with the incoming video signal. The station 300 processes video signals in the same way as the station 200. Thus, the station 300 comprises the NTSC video camera 350 for generating a video signal for transmission to the station 200, and an NTSC projector 360 for receiving a video signal from the station 200 and for projecting a corresponding image on the screen 370. The projectors 260 and 360 may be rear projection or front projection projectors.

Each station 200,300 displays on its screen 270,370 a wide aspect view of the other station. This is accomplished as follows. Consider the case of a video image generated at the station 200 and displayed at the station 300. Attached to the camera 250 is a transformation element in the form of an anamorphic lens 280. The anamorphic lens is located at the optical input 237 of the camera 250. The purpose of the anamorphic lens 280 is to map a wide aspect ratio field of view into an NTSC aspect ratio. An anamorphic lens has different focal lengths in the vertical and horizontal planes so it achieves different image magnifications in the vertical and horizontal directions. To transform an HDTV aspect ratio (16×9) into an NTSC aspect ratio (4×3), the anamorphic lens is required to expand the vertical component of the image by a factor 1.33 or reduce the horizontal component of the image by a factor 1.33.

Figure 2:
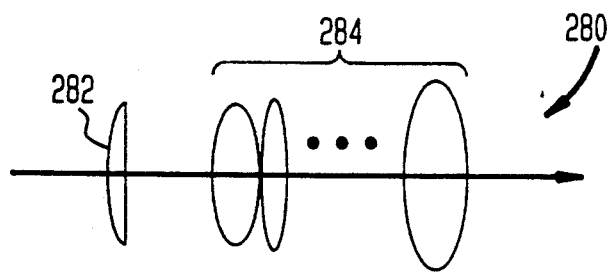
FIG. 2 schematically illustrates an anamorphic lens for use in the teleconferencing system of FIG. 1.

An anamorphic lens 280 is schematically illustrated in FIG. 2. The anamorphic lens 280 comprises a cylindrical lens 282 which is symmetric about a single axis and a combination of spherical lenses 284 which are symmetric about two perpendicular axes (not shown). The cylindrical lens 282 is the key element because it provides magnification or reduction along a single axis. The spherical lenses are used to adjust the center and edge focus. (Anamorphic lenses have previously been utilized in non-real time movie systems to image a wide aspect ratio onto a more square film. The reels of film are later placed in a movie projector equipped with a second anamorphic lens to undo the geometric distortion.)

In the teleconferencing system of FIG. 1, the NTSC video signal produced by the NTSC camera 250, as transformed by the anamorphic lens 280, is transmitted from the station 200 via the codec 240, the network 400, and the codec 340 to the NTSC projector 360 at the station 300. The aspect ratio transformation introduced by the anamorphic lens 280 at the station 200 is reversed at the station 300. This transformation reversal can be accomplished by a second anamorphic lens 390 at the optical output of the projector 360. This is most suitable for an LCD type projector.

Figure 3:
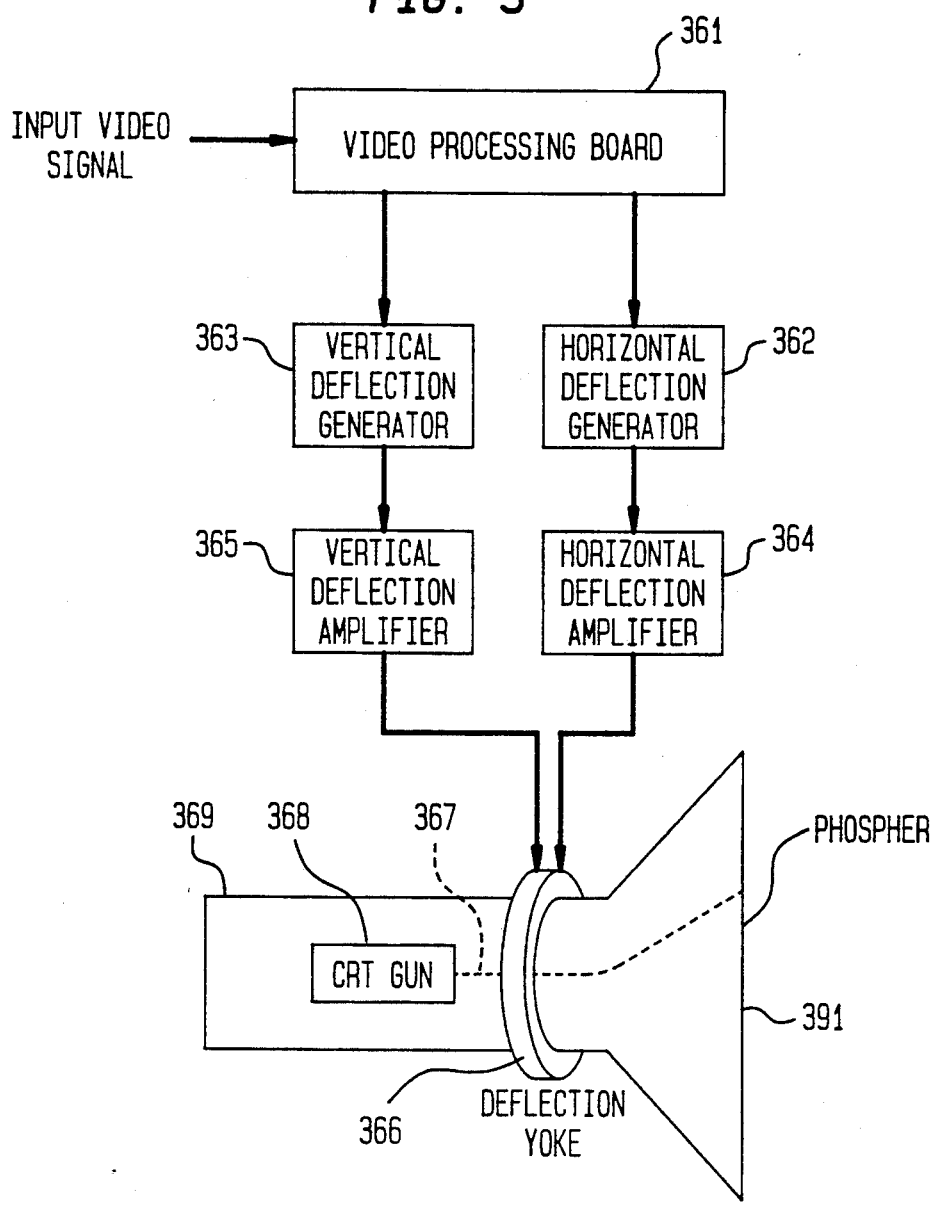
FIG. 3 schematically illustrates a projector for use in the teleconferencing system of FIG 1.

Alternatively, for a CRT type projector, the aspect ratio transformation introduced by the anamorphic lens 280 at the station 200 can be reversed at the station 300 electronically by adjusting the horizontal or vertical deflector amplifier gain in the projector 360. The operation of the projector 360 in this manner is illustrated in greater detail in FIG. 3. As shown in FIG. 3, a CRT type projector 360 receives an NTSC video input signal at the video processing board 361. The video processing board 361 derives the vertical and horizontal timing patterns from the input video signal and sends them to the horizontal and vertical deflection generators 362 and 363, respectively. The signals from the horizontal deflection generator 362 and the vertical deflection generator 363 are amplified by the horizontal deflection amplifier 364 and the vertical deflection amplifier 365, respectively. The output signals of the horizontal and vertical deflection amplifiers 364 and 365 are applied to the deflection yoke 366. The yoke 366 alters the path of the electron beam 367 emitted by the electron gun 368 contained in the vacuum tube 369 to form the desired raster on the phosphor screen 391. By individually adjusting the gains in the horizontal and vertical deflection amplifiers 364 and 365, the transfer function between the deflection generators 363 and 364 and the resulting image on the screen 391 is adjusted. In this manner, the vertical and horizontal dimensions of the image on the screen 391 are individually adjusted. By properly adjusting the gain of the vertical and horizontal deflection amplifiers 364 and 365, the aspect ratio transformation introduced by the anamorphic lens 280 at the station 200 can be reversed. Video projectors having deflection amplifiers with adjustable gains are commercially available.

Figure 4A:
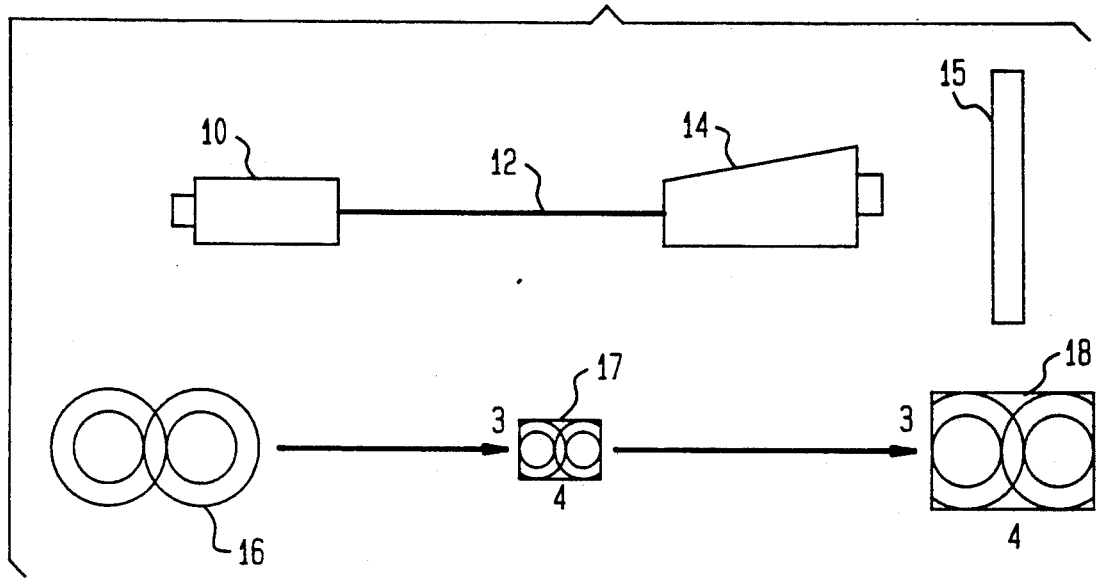
FIGS. 4A and 4B illustrate the aspect ratio transformations performed in the teleconferencing system of FIG 1.
Figure 4B:
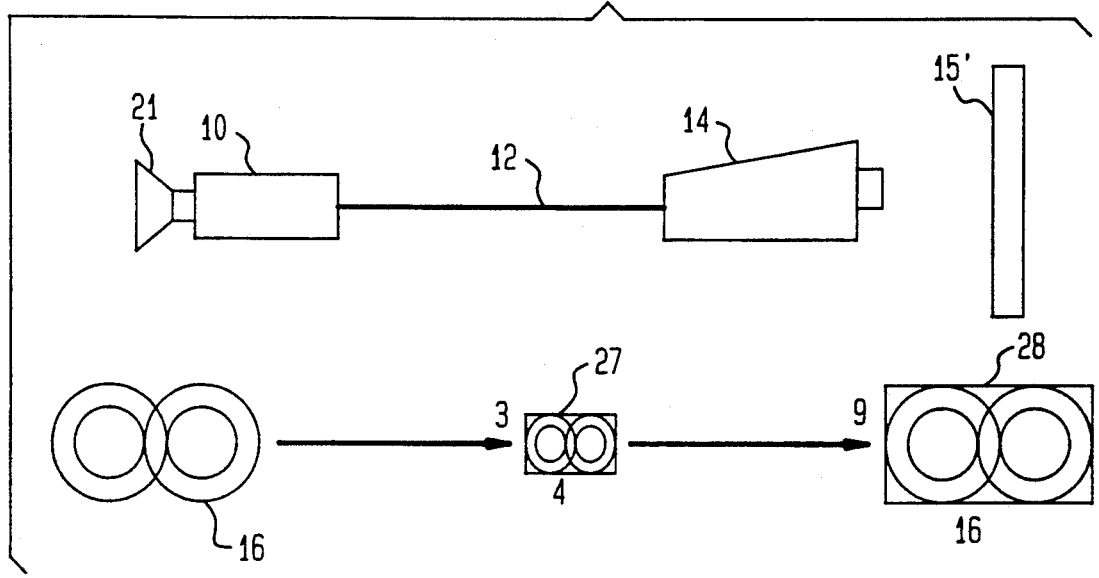

The aspect ratio transformations performed at the stations 200 and 300 of the teleconferencing system 100 are illustrated in greater detail in FIG. 4A and FIG. 4B.

FIG. 4A illustrates a conventional NTSC video camera 10 which is connected by a video channel 12 to a conventional NTSC projector 14 which displays an NTSC image on a screen 15 having an NTSC aspect ratio. The NTSC camera images the object 16, which object has a 16×9 aspect ratio, so as to enable the projector 14 to display the object 16 on the screen 15. Illustratively, the object 16 represents two teleconference participants sitting side by side. If the focal length (or distance to the object) of the camera 10 is set so that the object 16 fills the vertical field of view of the camera, a portion of the 16×9 aspect ratio object falls outside the horizontal field of view of the camera 10 as the field of view of the camera is 4×3. This is shown by the image 17, which is the image at the output of the camera 10, and by the image 18, which is the image formed by the NTSC projector 14 on the NTSC screen 15. In a conventional NTSC teleconferencing system, this problem is solved by moving the camera further away from the object so that the object fits into the NTSC field of view. However, in this case the object (e.g. two conference participants sitting side by side) appears small when viewed on the screen 15.

FIG. 4B shows how the problem of FIG. 4A is overcome when the present invention is utilized. In FIG. 4B an anamorphic lens 21 is attached to the front of the video camera 10. The camera 10 is again positioned so that the object 16 fills the vertical field of view of the NTSC camera 10. However, in this case the anamorphic lens 21 transforms the image in the horizontal direction with a reduction by a factor of 1.33. Thus, the entire object 16 fits in the NTSC field of view as shown by the image 27 which is the image at the output of the camera 10 as distorted by the lens 21.

A wide aspect ratio (i.e. 16×9) image 28 is then displayed by the projector 14 on a wide aspect ratio 16×9 screen 15'. The reduction in the horizontal dimension introduced by the anamorphic lens 21 is undone by electronically adjusting the gain of the horizontal deflection amplifier in the projector 14 or by utilizing a second anamorphic lens in front of the projector.

While the operation of the system 100 of FIG. 1 has been explained in connection with the transmission of an image from the station 200 to the station 300, it should be noted that images can be transmitted from the station 300 to the station 200 in the very same manner. Thus, the camera 350 at the station 300 is equipped with the anamorphic lens 380 for performing aspect ratio transformations. The station 200 is equipped with a projector 260 whose aspect ratio can be adjusted electronically or by use of the optical anamorphic lens 290 to reverse a transformation introduced at the station 300.

Figure 5:
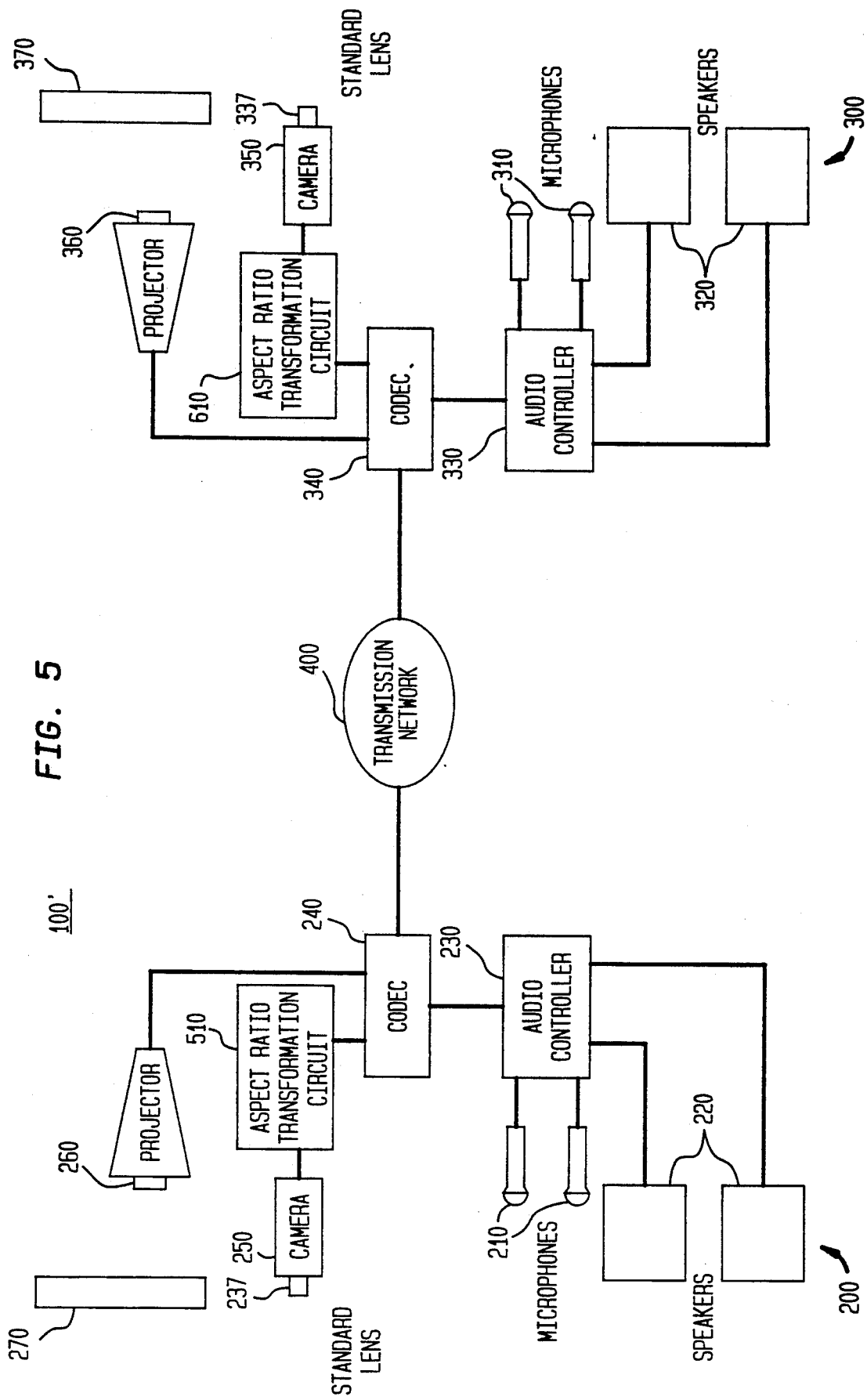
FIG. 5 schematically illustrates a teleconferencing system in accordance with an alternative embodiment of the invention.

An alternative teleconferencing system 100' is illustrated in FIG. 5. The teleconferencing system 100' of FIG. 5 is the same as the teleconferencing system 100 of FIG. 1 except that the anamorphic lenses 280 and 380 are not present at the cameras 250 and 350 to perform aspect ratio transformations.

Instead the station 200 includes an aspect ratio transformation circuit 510 which is connected electronically to the output of the camera 250. Similarly, the station 300 includes an aspect ratio transformation circuit 610 which is connected to the output of the camera 350. These aspect ratio transformation circuits can be used to transform the aspect ratio of an image by expanding an image along a direction by interpolation or by reducing an image along a direction by decimation. The transformation is then undone at the receiving projector either electronically or optically.

An aspect ratio transformation circuit 510 is illustrated in greater detail in FIG. 6. A composite analog NTSC video signal, including sync and color sub-carrier, is received at the decoder 511 and converted into its red, green and blue components. The analog red, green and blue signals are then converted to digital form by the analog-to-digital converter 512. The digitized red, green and blue signals are then stored briefly in the corresponding input frame buffer 513, which comprises separate red (R), green (G) and blue (B) memories. Each pixel in the input buffer 513 is mapped by the resampling circuit 514 into the output frame buffer 515. In particular, the resampling circuit 514 transforms the aspect ratio of an image using interpolation or decimation depending on whether expansion or reduction is desired in a given direction. The resampling circuit is available commercially (TMC2301 or TMC2302 from TRW). A connection 516 to a microprocessor (not shown) allows a user to modify the transformation which is performed. If a fixed transformation is all that is desired, fixed logic (not shown) may be utilized instead of a microprocessor. The pixels in the output frame buffer 515 are converted back to analog form by the digital-to-analog converter 517. The resulting signal is then NTSC coded using the coder 518.

The aspect ratio transformations performed by the aspect ratio transformation circuits 510 and 610 may be understood in connection with FIG. 7A and FIG. 7B. FIG. 7A shows a conventional NTSC video camera 30, an NTSC transmission channel 32, and an NTSC projector 34. The purpose of the camera 30 is to image the object 16 for display by the projector 34 on a screen 33 at a remote location. The screen 33 has an NTSC aspect ratio. The object 16 has a 16×9 aspect ratio. Illustratively, the object 16 represents two teleconference participants sitting side by side. The camera 30 is positioned so that the object 16 just fits inside the horizontal field of view of the NTSC camera 30. This can be seen from the image 35, which is the video image corresponding to the camera output, and the image 36, which is the image projected by the projector 34 onto the screen 33. The disadvantage of the images 35 and 36, which have the NTSC aspect ratio, is that the object does not fill the vertical field of view so that the object appears small.

This problem is solved in the system of FIG. 7B according to the present invention. In FIG. 7B, an aspect ratio transformation circuit 40 is connected to the output of the camera 30. In addition, the NTSC screen 33 of FIG. 7A is replaced by the 16×9 aspect ratio screen 33'. The image 35 corresponding to the video signal at the output of the camera 30 is the same as in FIG. 7A. However, the image 35 is expanded by a factor of 1.33 in the vertical direction by the aspect ratio transformation circuit 40 to form the image 46. The image 46 corresponds to the video signal at the output of aspect ratio transformation circuit 40 which introduces a distortion into the image it receives at its input. Note the object 16 fills the entire vertical field of view of the image 16. The aspect ratio transformation introduced by the circuit 40 is reversed by the projector 34 which now form the wide aspect ratio image 47 on the screen 33'.

Instead of using the aspect ratio transformation circuits 510 and 610, one can modify the coding algorithm of the NTSC codecs 240 and 340 to achieve the aspect ratio transformation. Typically, a compression coder discards video pixels in both the horizontal and vertical directions to reduce the amount of image information that must be encoded. The decoder on the other hand, receives the compressed image data, and performs vertical and horizontal interpolation to reconstruct the image. For example, the coder may discard every other pixel on a scan line and further discard every other scan line before encoding. Suppose that the codec is modified to discard the first and last 25% of the scan lines, keeping the remaining 50% centered vertically in the image field. When such image fields are decoded by a standard decoder at the receiving end, the receiver inserts interpolated lines between each horizontal scan line. The result is an image that is effectively stretched vertically, and when it is delivered to a projector with electronically adjusted aspect ratio, an 8×3 image is projected on the screen. Even though this example is given for the sake of simplicity for an aspect ratio transformation from 4×3 to 8×3, the concept of manipulating the decimation process to perform aspect ratio transformation is valid for going from 4×3 to 16×9 or some other aspect ratio. The overall system is then equivalent to that shown in FIG. 5, but it does not require a separate aspect ratio transformation circuit.

As shown in FIG. 8, the present invention is compatible with Quad Boxes or other devices which enable a multiplicity of video signals to be combined into a single video signal for display at a single location by a single projector on a screen. The system 700 of FIG. 8 comprises four transmitting stations 710, 720, 730, 740. Each transmitting station comprises an NTSC camera 718, 728, 738, 748 and an aspect ratio transformation device. The transmitting station 720 includes the aspect ratio transformation circuit 721 while the other transmitting stations 710, 730 and 740 utilize anamorphic lenses 711, 731, and 741.

Each transmitting station images an object 716 having a 16×9 aspect ratio which may represent a pair of conference participants sitting side-by-side. The aspect ratio transformation devices (anamorphic lens or aspect ratio transformation circuit) insure that the 16×9 aspect ratio object 16 at each station is mapped into the 4×3 NTSC aspect ratio for transmission to a remote location 800 via the channels 712, 722, 732, 742. The video signal transmitted on each channel 712, 722, 732 and 742 corresponds to the distorted image 717.

At the remote location 800, an NTSC signal from each transmitting station and corresponding to the image 717 is inputted into a quad box 804. The output of the quad box 804 is a single video signal corresponding to a composite NTSC image 718 which is formed from the four input NTSC images. The aspect ratio of the image 718 is then transformed by the projector 806 to form a composite 16×9 aspect ratio image 719 on the screen 808. Note that each sub-image in the composite image 719 is a wide aspect ratio image.

In short, there has been disclosed a teleconferencing system which provides a wide aspect ratio view at each conference site utilizing a single NTSC camera and projector at each site. At the transmitting end of a teleconference, a transformation element maps a wide aspect ratio field of view into the field of view of an NTSC camera which then transmits a distorted NTSC image to a receiving site. The transformation is reversed at the receiving end so that a wide aspect image is generated at the receiving end. Finally, the above described embodiments of the invention are intended to be illustrative only. Numerous alternative embodiments may be devised by those skilled in the art without departing from the spirit and scope of the following claims.

We claim:

1. A teleconferencing system comprising
first and second stations in communication with each other, each station including means for generating a video image for transmission to the other station and for receiving a video image transmitted form the other station, each station including means for transforming an aspect ratio of a video image generated by it, said transforming means comprising an electronic circuit including a resampling circuit for transforming the aspect ratio of said image received from said generating means, said resampling circuit including means for interpolating said image and means for decimating said image, and each station including means for reversing an aspect ratio transformation in a video image received by it.

2. The teleconferencing system of claim 1 wherein said reversing means comprises an electronic circuit including
means for receiving said image from said other station and for converting said image into components,
an image resampling circuit for reverse transforming the aspect ratio of said image by processing said components producing a reversed-transformed signal, said resampling circuit including means for interpolating and means for decimating said image, and
means for coding said reverse-transformed signal from said resampling circuit.

3. A video teleconferencing station comprising an NTSC camera for generating a first NTSC video image for transmission to a remote station,
transformation means for transforming said first video image to map a wide aspect field of view into said first NTSC video image, said transformation means comprising a resampling circuit connected to an electronic output of said camera, said resampling circuit including means for interpolating and means for decimating said first video image, and
an NTSC projector for receiving a second NTSC video image from said remote location including means for reversing a transformation introduced into said second NTSC video image at said remote location for forming a wide aspect ratio image for display at said station.

4. A teleconferencing system comprising
first and second stations in communication with each other, each station including means for generating a video image for transmission to the other station and for receiving a video image transmitted from the other station, each station including a codec which includes means for coding the video image generated at said generating means and for transforming an aspect ratio of the video image generated at said generating means and means for decoding the video image transmitted from the other station and for reversing an aspect ratio transformation transmitted from the other station.

5. A teleconferencing system comprising
a transmitting station comprising an NTSC camera and a transformation element coupled to said NTSC camera for introducing a transformation into an image produced by said NTSC camera to map a wide aspect ratio field of view into said image produced by said NTSC camera, said transformation element comprising an electronic circuit connected to an output of said NTSC camera, wherein said electronic circuit comprises an image resampling circuit, and
a receiving station connected to said transmitting station by a transmission channel, said receiving station comprising means for receiving said NTSC image generated by said NTSC camera including reversing means for reversing said transformation introduced into said NTSC image at said transmitting station and means for displaying said image on a screen having a wide aspect ratio to provide a wide aspect view of said image produced by said NTSC camera at said receiving station.

6. The teleconferencing system of claim 1 wherein said resampling circuit comprises
means for transforming the aspect ratio of said image received from said NTSC camera.

7. The teleconferencing system of claim 6 wherein said transforming means comprises means for interpolating said image.

8. The teleconferencing system of claim 6 wherein said transforming means comprises means for decimating said image.

9. The teleconferencing system of claim 1 wherein said electronic circuit of said transformation element further comprises
means for receiving said image from said NTSC camera and for converting said image into components to be processed at said resampling circuit and
means for converting an output signal from said resampling circuit and for coding said output signal for transmission to said receiving station.

10. The teleconferencing system of claim 1 wherein said reversing means for reversing said transformation comprises an electronic circuit connected to said means for displaying said image on said screen, said electronic circuit of said reversing means including means for receiving said image from said transmitting station and for converting said image into components, an image resampling circuit for reverse transforming the aspect ratio of said image by processing said components producing a reversed-transformed signal, said resampling circuit including means for interpolating and means for decimating said image, and means for coding said reverse-transformed signal from said resampling circuit to be displayed by said displaying means.

\* \* \* \* \*

UNITED STATES PATENT AND TRADEMARK OFFICE
CERTIFICATE OF CORRECTION

PATENT NO. : 5,280,540
DATED : January 18, 1994
INVENTOR(S) : Addeo, et. al.

It is certified that error appears in the above-indentified patent and that said Letters Patent is hereby corrected as shown below:

Column 10, line 50, change claim "1" to read -- 5 --.
Column 10, line 60, change claim "1" to read -- 5 --.
Column 11, line  1, change claim "1" to read -- 5 --.

Signed and Sealed this

Eleventh Day of February, 1997

Attest:

BRUCE LEHMAN

*Attesting Officer*          *Commissioner of Patents and Trademarks*